US006050486A

United States Patent [19]

French et al.

[11] Patent Number: 6,050,486

[45] **Date of Patent: *Apr. 18, 2000**

[54] ELECTRONIC POSTAGE METER SYSTEM SEPARABLE PRINTER AND ACCOUNTING ARRANGEMENT INCORPORATING PARTITION OF INDICIA AND ACCOUNTING INFORMATION

[75] Inventors: Dale A. French, Clinton; Kathryn V. Lawton, Branford, both of Conn.

[73] Assignee: Pitney Bowes Inc., Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/703,312

[22] Filed: Aug. 23, 1996

[51] Int. Cl.[7] .............................. G06G 1/00; G06F 17/00

[52] U.S. Cl. .............................. 235/101; 235/375; 235/380

[58] Field of Search .............................. 235/101, 375, 235/379, 380, 382; 705/401, 408

[56] References Cited

U.S. PATENT DOCUMENTS

| | | | |
|---|---|---|---|
| 3,978,457 | 8/1976 | Check, Jr. et al. | 340/172.5 |
| 4,122,526 | 10/1978 | Dlugos et al. | 364/705 |
| 4,168,533 | 9/1979 | Schwartz | 364/900 |
| 4,301,507 | 11/1981 | Soderberg et al. | 364/464 |
| 4,493,252 | 1/1985 | Clark | 101/71 |
| 4,535,419 | 8/1985 | Dlugos et al. | 364/900 |
| 4,579,054 | 4/1986 | Buan et al. | 101/91 |
| 4,644,142 | 2/1987 | Payn | 235/101 |
| 4,725,718 | 2/1988 | Sansone et al. | 235/495 |
| 4,739,343 | 4/1988 | Dolan | 346/76 PH |
| 4,757,537 | 7/1988 | Edelmann et al. | 380/51 |
| 4,775,246 | 10/1988 | Edelmann et al. | 380/23 |
| 4,796,193 | 1/1989 | Pitchenik | 364/464.02 |
| 4,802,218 | 1/1989 | Wright et al. | 380/23 |
| 4,809,185 | 2/1989 | Talmadge | 364/464 |
| 4,813,912 | 3/1989 | Chickneas et al. . | |
| 4,831,555 | 5/1989 | Sansone et al. | 364/519 |
| 4,853,523 | 8/1989 | Talmadge | 235/492 |
| 4,858,138 | 8/1989 | Talmadge | 364/464.02 |
| 4,958,291 | 9/1990 | Mamone et al. | 235/379 |
| 4,980,542 | 12/1990 | Jackson et al. . | |
| 5,051,564 | 9/1991 | Schmidt . | |
| 5,065,000 | 11/1991 | Pusic . | |
| 5,111,030 | 5/1992 | Brasington et al. | 235/375 |
| 5,237,506 | 8/1993 | Horbal et al. | 364/464.02 |
| 5,293,319 | 3/1994 | DeSha et al. | 364/464.02 |
| 5,309,363 | 5/1994 | Graves et al. | 364/464.02 |
| 5,319,562 | 6/1994 | Whitehouse | 364/464 |
| 5,359,359 | 10/1994 | Dietrich et al. | 346/143 |
| 5,367,464 | 11/1994 | Abumehdi et al. | 364/464.02 |
| 5,375,172 | 12/1994 | Chrosny | 380/51 |
| 5,390,251 | 2/1995 | Pastor et al. | 380/21 |
| 5,440,108 | 8/1995 | Tran et al. . | |
| 5,490,077 | 2/1996 | Freytag . | |
| 5,552,991 | 9/1996 | Lee et al. | 364/464.02 |
| 5,585,613 | 12/1996 | Bell et al. | 235/101 |
| 5,799,290 | 8/1998 | Dolan et al. | 705/410 |
| 5,812,400 | 9/1998 | Eddy et al. | 364/464.02 |
| 5,844,220 | 12/1998 | Eddy et al. | 235/375 |

FOREIGN PATENT DOCUMENTS

| | | | |
|---|---|---|---|
| 0409780 | 1/1991 | European Pat. Off. | G07B 17/02 |
| 0 493 949 | 7/1992 | European Pat. Off. | G07B 17/02 |
| 0621562 | 10/1994 | European Pat. Off. | G07B 17/00 |
| 0 665 517 | 1/1995 | European Pat. Off. | G07B 17/00 |
| 44 22 263 | 6/1994 | Germany | G06F 17/04 |

*Primary Examiner*—Donald Hajec
*Assistant Examiner*—Daniel St. Cyr
*Attorney, Agent, or Firm*—Alberta A. Vitale; Steven J. Shapiro; Charles R. Malandra, Jr.

[57] ABSTRACT

A postage metering system includes means for printing postage a postage indicia. The printing means has first meter data stored therein. Means are coupled to the printing means for accounting for value printed by said printing means. The accounting means has second meter data stored therein. Means are provided for operating the printing means to print an indicia containing said first meter data from said printing means and said second meter data from said accounting means.

6 Claims, 8 Drawing Sheets

ELECTRONIC POSTAGE METER SYSTEM SEPARABLE PRINTER AND ACCOUNTING ARRANGEMENT INCORPORATING PARTITION OF INDICIA AND ACCOUNTING INFORMATION

BACKGROUND OF THE INVENTION

Traditional electronic postage metering systems include both a single printing arrangement associated with a single accounting arrangement. These printing and accounting systems have been traditionally housed in a single secure housing to provide for protection against tampering to provide for security. Other types of electronic postage metering systems have involved the utilization of portable detachably connectable accounting systems such as smart cards and other portable type devices.

These postage meter systems involve both prepayment of postal charges by the mailer (prior to postage value imprinting) and post payment of postal charges by the mailer (subsequent to postage value imprinting). Prepayment meters employ descending registers for securely storing value within the meter prior to printing whole post payment (current account) meters employ ascending registers account for value imprinted. Postal charges or other terms referring to postal or postage meter or meter system as used herein should be understood to mean charges for either postal charges, tax charges, private carrier charges, tax service or private carrier service, as the case may be, and other value metering systems, such as certificate metering systems such as is disclosed in U.S. Patent Application of Cordery, Lee, Pintsov, Ryan and Weiant, Ser. No. 08/518,404, filed Aug. 21, 1995, for SECURE USER CERTIFICATION FOR ELECTRONIC COMMERCE EMPLOYING VALUE METERING SYSTEM assigned to Pitney Bowes, Inc.

Some of the varied types of postage metering systems are shown, for example, in U.S. Pat. No. 3,978,457 for MICRO COMPUTERIZED ELECTRONIC POSTAGE METER SYSTEM, issued Aug. 31, 1976; U.S. Pat. No. 4,301,507 for ELECTRONIC POSTAGE METER HAVING PLURAL COMPUTING SYSTEMS, issued Nov. 17, 1981; and U.S. Pat. No. 4,579,054 for STAND ALONE ELECTRONIC MAILING MACHINE, issued Apr. 1, 1986. Moreover, the other types of metering systems have been developed which involve different printing systems such as those employing thermal printers, ink jet printers, mechanical printers and other types of printing technologies. Examples of some of these other types of electronic postage meters are described in U.S. Pat. No. 4,168,533 for MICROCOMPUTER MINIATURE POSTAGE METER, issued Sep. 18, 1979; and U.S. Pat. No. 4,493,252 for POSTAGE PRINTING APPARATUS HAVING A MOVABLE PRINT HEAD AN A PRINT DRUM, issued Jan. 15, 1985. These systems enable the postage meter to print variable information, which may be alphanumeric and graphic type information.

Postage metering systems have also been developed which employ encrypted information on a mailpiece. The postage value for a mailpiece may be encrypted together with the other data to generate a digital token. A digital token is encrypted information that authenticates the information imprinted on a mailpiece such as postage value. Examples of postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 15, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,725,718 for POSTAGE AND MAILING INFORMATION APPLYING SYSTEMS, issued Feb. 16, 1988. These systems, which may utilize a device termed a Postage Evidencing Device (PED) or Postal Security Device (PSD), employ an encryption algorithm which is utilized to encrypt selected information to generate the digital token. The encryption of the information provides security to prevent altering of the printed information in a manner such that any change in a postal revenue block is detectable by appropriate verification procedures.

Encryption systems have also been proposed where accounting for postage payment occurs at a time subsequent to the printing of the postage. Systems of this type are disclosed in U.S. Pat. No. 4,796,193 for POSTAGE PAYMENT SYSTEM FOR ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED, issued Jan. 3, 1989; U.S. Pat. No. 5,293,319 for POSTAGE METERING SYSTEM, issued Mar. 8, 1994; and, U.S. Pat. No. 5,375,172, for POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF THE POSTAGE, issued Dec. 20, 1994.

Other postage payment systems have been developed not employing encryption. Such a system is described in U.S. Pat. No. 5,391,562 for SYSTEM AND METHOD FOR PURCHASE AND APPLICATION OF POSTAGE USING PERSONAL COMPUTER, issued Feb. 21, 1995. This patent describes a system where end-user computers each include a modem for communicating with a computer and a postal authority. The system is operated under control of a postage meter program which causes communications with the postal authority to purchase postage and updates the contents of the secure non-volatile memory. The postage printing program assigns a unique serial number to every printed envelope and label, where the unique serial number includes a meter identifier unique to that end user. The postage printing program of the user directly controls the printer so as to prevent end users from printing more that one copy of any envelope or label with the same serial number. The patent suggests that by capturing and storing the serial numbers on all mailpieces, and then periodically processing the information, the postal service can detect fraudulent duplication of envelopes or labels. In this system, funds are accounted for by and at the mailer site. The mailer creates and issues the unique serial number which is not submitted to the postal service prior to mail entering the postal service mail processing stream. Moreover, no assistance is provided to enhance the deliverability of the mail beyond current existing systems.

Recently, the United States Postal Service has published proposed draft specifications for future postage payment systems, including the Information Based Indicium Program (IBIP) Indicium Specification dated Jun. 13, 1996 and the Information Based Indicia Program Postal Security Device Specification dated Jun. 13, 1996. These are Specifications disclosing various postage payment techniques including various types secure accounting systems that may be employed, as for example, a single chip module, multi chip module, and multi chip stand alone module (See for example, Table 4.6-1 PSD Physical Security Requirements, Page 4—4 of the Information Based Indicia Program Postal Security Device Specification).

SUMMARY OF THE INVENTION

It has been discovered that the utilization of multiple accounting systems with a single printing mechanism pose unique and particular problems, particularly where the system involves the generation and printing of digital indicia which include encrypted information such as digital tokens to authenticate the validity of the indicia.

It has also been discovered that problems in generating the digital indicia where portable accounting systems are employed may have additional problems of limited memory and/or processing speed capability such as smart cards. This is because generating digital indicia requires a certain level of computing capability and memory storage.

It has been discovered that in metering systems that include a single printing arrangement with multiple accounting systems, information may be partitioned between the accounting arrangement and the printing arrangement to provide enhanced capability.

It has been recognized that the information contained in an indicia can be separately generated in separate modules thereby reducing the burden on any single module and providing enhanced security and portability for the system.

It is an object of the present invention to insure that a correct indicia is produced, with correct accounting while minimizing nonvolatile storage, programming size and processing necessary capability for metering systems with portable accounting systems.

Additionally, it is another objective of the present invention to enhance the speed at which a metering system can generate encrypted indicias to be imprinted on a mail piece.

It is still a further objective of the present invention to provide a metering system, particularly those which employ portable accounting systems or accounting systems with limited memory and/or processing speeds, which may generated encrypted indicia at speeds which allow real time imprinting of mailpieces with encrypted indicias.

It is still a further objective of the present invention to enhance the security of postage meter systems with separable printing and accounting systems.

It is yet a further objective of the present invention to enhance the information and data recovery of metering related and other data in metering systems with separable printing and accounting systems.

It is an object of the present invention to provide a system wherein the printing and accounting are in separate modules and the information to generate an indicia from both modules.

As a further object of the invention to partition the information used in indicia so that it can be efficiently and effectively generated in a distributed processing environment.

With these and other objectives in mind, a postage metering system embodying the present invention includes means for printing a postage indicia. The printing means has first meter data stored therein. Means are coupled to the printing means for accounting for value printed by said printing means. The accounting means has second meter data stored therein. Means are provided for operating the printing means to print an indicia containing said first meter data from said printing means and said second meter data from said accounting means.

BRIEF DESCRIPTION OF THE DRAWINGS

Reference is now made to the following figures wherein like reference numerals designate similar elements in the various views and in which.

DETAILED DESCRIPTION OF THE PREFERRED EMBODIMENT

General Overview

Figure 1:
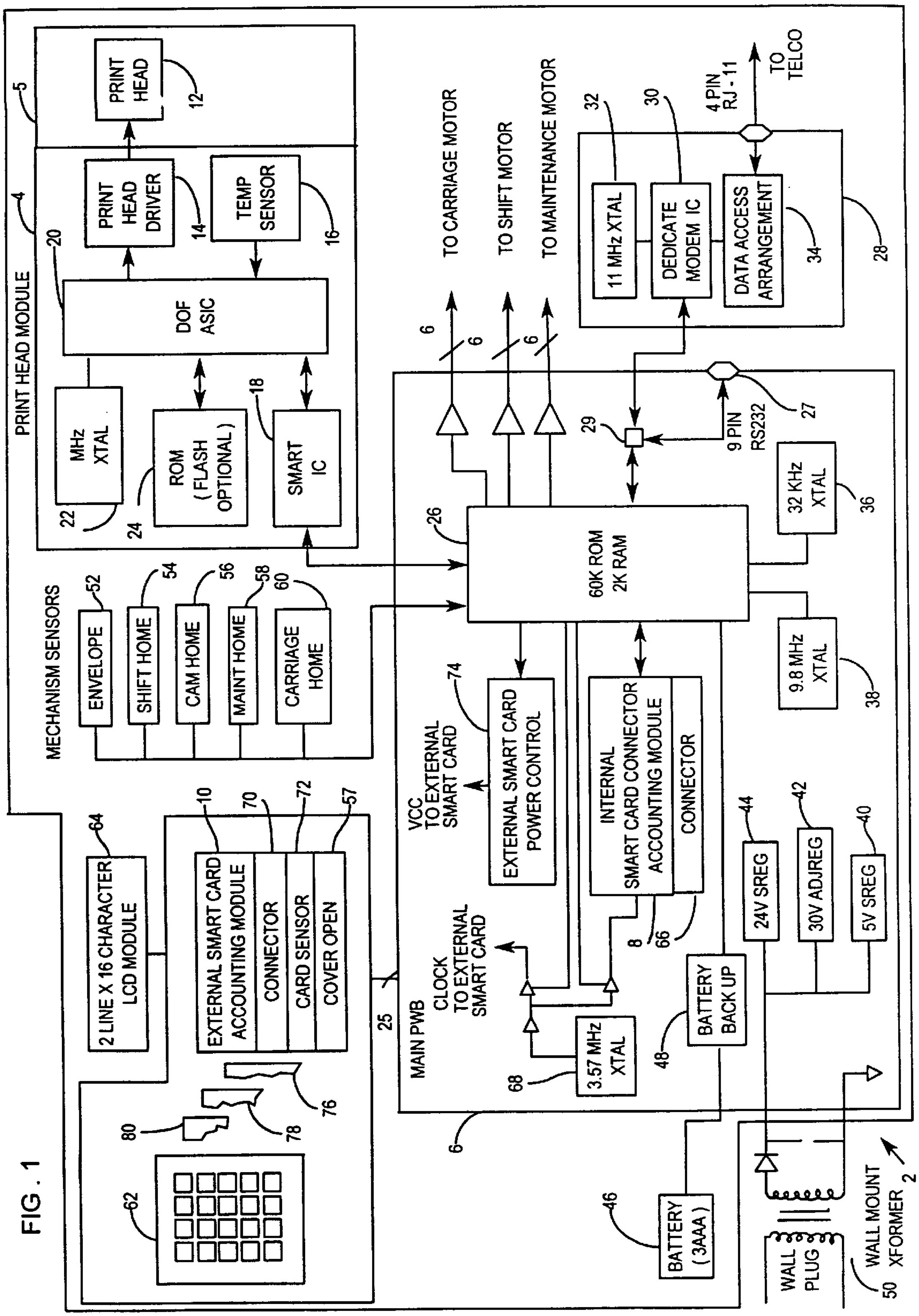
FIG. 1 is a schematic diagram of a postage meter system incorporating the present invention.

The electronic postage meter system shown in FIG. 1 includes an internal accounting system and multiple removable external accounting systems. The external accounting system may be any suitable type of portable devices detachably coupled to the metering system. These include, for example, smart cards, ASICs, dongles and other types of removably coupled devices which provide for accounting functionality for a metering system. These may also include remote devices and systems which are detachably connectable to the metering system.

The metering system involves multi secure accounting systems such as smart cards to provide accounting capability and functionality enhancement for the metering system. The term vault is used herein interchangeably with the term accounting system. The metering system is enabled to either utilize an internal secure accounting system only, an external secure accounting system only, or multiple secure accounting systems. The multiple secure accounting system meter has a secure internal secure accounting system, but can also accommodate an external secure accounting system. This allows a family of metering products to be developed and implemented that provides increased functionality and capability.

Since portable devices are subject to loss and other security attacks such as theft or environmental problems such as bending, rubbing, exposure to dust, liquids, sharp objects, etc., the maximum amount of funds that are stored within such a portable device may be limited. The limit may be a maximum consistent with the value metering system, for example, one hundred ($100.00) dollars or any other selected amount. The internal secure accounting system may be a repository for larger amount of funds. Additionally, the portable device may be used in any of a large number of different metering systems, including Kiosk metering systems, thereby providing an increased functionality and utility to the meter system users.

The metering system shown in FIG. 1 includes an internal secure accounting system that may be physically mounted in the metering system at the time of manufacture. This internal secure accounting system may be a smart card permanently mounted in the metering system or the smart card chip without the larger housing of the card itself. Such an accounting system itself may be housed within its own secure housing such as is the case with a smart card chip or by means of a separate secure housing system. The smart card chip may consist of the smart card trimmed down to essentially a smaller version of the smart card. This may be manufactured by using a smart card plastic substrate that can be punched out from its carrier after the smart card chip is attached and thereafter the punched-out smart card chip mounted in the meter system. The punched-out smart card chip is like a normal smart card with most of the plastic substrate removed. The larger plastic substrate normally provides no functionality except to conform to the size requirements of the normal credit card and to position the chip on the plastic credit card. Since the smart card chip is devoted to being permanently mounted internally within the metering system, the smaller size is a benefit. That is, the punched-out smart card chip is never removed from the meter to be used in other non metering applications outside of the metering system except as explained herein. This smart card chip is an integrated circuit housed in a plastic holder which is then connected to the printed circuit board. It should be recognized that the integrated circuit itself can be directly mounted to the circuit board if desired or packaged in other integrated circuit formats.

The smart card chip may be permanently mounted within the appropriate printed circuit connector (plug removable) or designed to be mounted directly on a meter system printed circuit board. Additionally, the metering system accommodates an external secure portable accounting system (for example, smart card) as well as the internal securing accounting system (for example, smart card) thereby providing additional advantages. Thus, manufacturing of economics of scale are achieved because identical or similar smart card chips or other devices are used for the external and the internal accounting system.

The external secure accounting system, when it is a smart card sized vault, may be placed in a card slot or suitable detachable connector of the metering system. For a smart card, the card comes in contact with a special smart card connector designed for this purpose. That is, the metering system show in FIG. 1 has a sensing means such as a switch or other device to detect the presence of the smart card prior to applying voltage and reset to the pins on the card and also to sense the removal of the card or portable external accounting system.

The multi-accounting system approach provides various advantages including higher funds retention (storage) for the internal secure accounting system, higher reliability for the internal accounting system, portability of the external secure accounting system, and flexibility for multi functionality connection to the metering system such as ad slogans, "town circle graphics", authorization codes, data transfer, and rate table loading or software updates via the external secure accounting system connector.

Higher funds retention (storage) for the internal secure accounting system is enabled because postal funds and other value can be inserted into the internal accounting system because it is permanently installed and is less subject to being lost or stolen as is the case of a small external portable accounting system. Higher reliability for the internal secure accounting system occurs because it is mounted in the metering unit and is not subject to harsh external environments (temperature/humidity, ESD), adverse handling, and multiple insertions that wear and/or contaminate the contacts of a small external portable device. Portability of the external secure accounting system enables external devices to be used in multifunctional fashion such as a mini accounting system (that is a different card or external accounting system for each account) and enables the use of other features and functionalities. Additionally, added and other functionality may be included in the external accounting system such that, for example where the external secure accounting system is a smart card, the system can be a cash card or a credit card which additionally has postage accounting capabilities. Finally, as noted above, it is possible to employ the external vault as a vehicle to load ad slogans, rate tables, and authorization codes and other information into or out of the metering system. These transfers may be loaded under encryption control and/or be stored within the metering system such as in a print module or internal accounting system of the metering system where date storage may reside.

Because the metering system employs multi secure accounting systems, an internal accounting system and an external accounting system, the metering system includes a prioritization arrangement to determine which accounting system should be used for debiting and crediting activity.

Any time two accounting systems are present, a user wanting to print an indicia or digital token could enter postage value and debit the active accounting system. The metering system provides the capability for a system where many external accounting systems may be employed by a single metering system. The metering system includes a portable device connector which enables funds debiting, token retrieval, funds audit and crediting of multiple accounting systems. Depending upon the meter system configuration of the number and type of secure accounting systems, internal to the metering system or external to the metering system, a selection criteria is used to choose the active accounting system. The possible configurations in the metering system shown in FIG. 1 include an internal secure accounting system only, an external secure accounting system only and an internal and (optional) external secure accounting systems. In the case where there are both an internal and optional external accounting system, a choice must be made as to which accounting system should be used when both accounting systems are present in the metering system.

The metering system shown in FIG. 1 accommodates the generation of digital tokens by both the internal and external secure accounting systems. Since the indicia includes the digital token and/or other information (as for example the information set forth in the proposed U.S. Postal Service Specifications), it is necessary to insure for a valid mailpiece to be prepared that the proper accounting system information is utilized in generating the digital token and that such digital token is employed in printing the mailpiece. This is necessary for the mailpiece to properly be put into the mail stream by the mailer and so that the carrier service may properly authenticate the mailpiece.

Digital tokens to be printed by the metering system 2 may include information which is in part based on the licensing Post Office zip code or other location information related to the meter user, hereinafter referred to as origin postal code. Currently, postage meter secure accounting systems which generate digital tokens are mounted within a meter base housing. This prevents the accounting system from being moved between meter bases.

When an indicia is printed, digits are generated that utilize forms of the origin postal code that are then printed as part of the indicia. These digital tokens are then used to verify the correctness and validity of portions of the digital indicia. Since historically, there is only a single vault (accounting system) and a single printing engine and the system is not easily portable (as a smart card), meter location movement has not been as serious an issue. With portable external accounting system meters, however, it is quite easy to move and use a portable secure accounting system between many printing engines "bases" spanning different postal regions (origin postal codes). The present system helps assure that the secure accounting system utilizes the correct postal code related data when generating the secure digital tokens or indicia.

Moreover, in a metering system such as shown in FIG. 1 that provides the capability of supporting more than a single secure accounting system, such as plural portable external accounting systems which may be from different origin postal codes, the meter system operates to update the packed postal code (origin postal code with any desired additional data) and the postal check digit that may be used by the vault to generate the secure digital tokens. The system shown in FIG. 1 stores target origin postal codes and operates to detect and transfer the origin postal codes to the secure accounting system to assure correct generation of the digital tokens.

The digital indicia or digital token contains an area of secure information that is used to verify the correctness and authenticity of the digital indicia. For example, these digital tokens may include the vendor ID, vendor digital token, postal digital token, and an indicia check digit. In encryption systems of this type, in order to correctly generate the indicia check digit, vendor digital token, and postal digital token, the packed postal code and the postal check digit for the origin postal code may be used. The origin postal code is usually the code associated with where the mailpiece will be sent from. This has also usually indicated where the meter is located. However, in products which separate the vault from the printing engine or "base", the vault can easily be moved from one origin postal code location to another. The packed postal code is derived from the origin postal code and it is used to represent the origin postal code in the calculation of the digital tokens mentioned above. The postal check digit represents the contribution of the origin postal code to the indicia check digit.

Since the metering system printing module may be physically contained within the base portion, it is not as easy to transport (as a portable external accounting system, e.g. smart card) and less likely to be moved between postal code locations. If this unit is moved, it is expected the user would contact the meter system manufacturer so that the postal code location stored within these systems may be updated. On the other hand, the external secure accounting system is quite easily transportable within a postal code region or between postal code regions. Furthermore, since in the present system there is no need for a correlation to be made between the external accounting system and the base and printing engine, any external accounting system may use any base with its associate removable printing module.

To insure correctness of the token generation, a master set of the origin postal code along with its associated packed postal code and postal check digit are stored within the base printing module. The initialization of this information occurs the first time the meter system user contacts the manufacturer for the initial refill of the secure accounting system with postage funds. At this first refill, the meter system recognizes it needs all of the postal code related data and electronically requests the data be downloaded to memory. At this time, the system will update the currently active secure accounting system in the meter system. The active secure accounting system could be either embedded within the meter system (internal accounting system) or inserted into the meter system connector. Anytime, an accounting system is inserted into the metering system, the meter system operates. to determines whether the secure accounting system possesses the same postal check digit that is stored as the master postal check digit stored in the memory of the printing module (or where ever else in the base this information may be stored). If the postal check digits match, no update is made. This is done to minimize the number of writes to nonvolatile memory of the secure accounting system. The nonvolatile memory in the meter system may have a maximum number of write cycles before the memory starts to degrade. This number correlates to the maximum of number debits made against the meter and consequently the maximum number of times that tokens will be generated.

For meter systems configured with an internal secure accounting system, the update of the internal accounting system postal check digit are initialized at the time the data is received for the base print module initialization. The packed postal code could be updated in the secure accounting at this time as well; however, in the preferred implementation, the packed postal code is transmitted at the time the postage funds and date of submission are transferred to the secure accounting system. The vault then uses the information it received prior to the debit as well as information received during initialization at the time the vault was inserted into the base unit housing.

System Organization and Operation

Reference is now made to FIG. 1. A postage meter system shown generally at 2, includes a removable printhead module 4 within a housing 5, a base module 6 and a secure internal accounting system module 8 and an external secure accounting system module 10 which will be hereafter explained in greater detail. The accounting systems include the internal accounting systems 8 and the external accounting system 10. These accounting systems account for the operation of the metering system and for the printing of postage value.

The print module 4 includes a printhead 12 which may be an ink jet printhead or other variable printing means. A printhead driver 14 provides the necessary signals and voltages to the printhead. A temperature sensor 16 is used to sense the ambient temperature. Since ambient temperature changes the viscosity of the printhead ink, this information enables change of the signals and voltages to the printhead to maintain a constant drop size.

A smart card chip 18 which contains internal nonvolatile storage receives encrypted command and control signals from the base unit and provides information to the ASIC 20 to operate the printhead driver 14. The ASIC, may be of the type described in copending U.S. patent application Ser. No. 08/554,179 filed Nov. 6, 1995 entitled MAIL HANDLING APPARATUS AND PROCESS FOR PRINTING AN IMAGE COLUMN-BY-COLUMN IN REAL TIME and assigned to Pitney Bowes, Inc., the disclosure of which is hereby incorporated by reference. The ASIC, connected to a crystal clock 22, obtains the necessary operating program information from a ROM or flash memory 24 so as to appropriately control the sequence of the information to the ink printhead driver such that the printhead produces a valid and properly imprinted indicia (which herein is meant to include a digital token in whatever format it is to be imprinted).

The base module includes a micro controller 26 which is connected to operate the electronic postage meter system motors and display and is coupled to the various accounting systems. The micro controller 26 is connected to a modem 28 which includes a modem chip 30 connected to a crystal clock 32 and a data access arrangement 34 for enabling modem communications between the metering system 2 and external systems.

An RS 232 port 27 is provided. The RS 232 port 27 is connected to the micro controller 26 via a switch 29 which is operated under the control of the micro controller 26 such that either the RS 232 port 27 is enabled or the modem 28 is enabled. Should the RS 232 port 27 be enabled, the port may be used for communicating with the metering system by way of modem, direct connection or other serial communication technique suitable for RS 232 communications.

The micro controller 26 additionally provides various control signals to operate the meter system including signals to the printhead carriage motor, the printhead shift motor and the printhead maintenance motor which are utilized to move, position and maintain the printhead 12. The micro controller 26 is operated under control of two separate crystal clocks 36 and 38. The higher frequency 9.8 megahertz crystal clock is used when the electronic meter system is in active operation and the lower speed 32 kilohertz crystal clock 36 is used when the meter is in a "sleep mode" and the display is blanked and the system is in a quiescent state.

Various power is provided to the micro computer and to the electronic postage meter system including a 5 volt regulated power supply 40, a 30 volt adjustable power supply 42, and a 24 volt regulated power supply 44. Additionally, a battery 46 is connected via a battery backup circuit 48 to the micro controller 26 to provide operating power for an internal clock in the micro controller 26 when the external source of AC operating power 50 is disconnected.

Various electronic postage meter sensors are connected to the micro controller 26 including envelope sensor 52 which senses the presence of an envelope in the envelope slot of the metering system, shift home sensor 54, which senses the home position of the shift motor (Y motor), a cam home sensor 56 which senses the cam position which controls the envelope platen movement, a carriage home sensor 60 which senses when the carriage is at a home position, a maintenance home sensor 58 which senses when the print head is at a maintenance position, and a cover open sensor 57.

The micro controller 26 is additionally connected to a key pad 62 and an LCD Display Module 64. This enables a user to enter data into the metering system to view information shown in the display 64.

The metering system 2 employs two accounting systems. The first accounting system involves the internal smart card (or smart card chip) 8 and the second accounting system involves an external smart card 10. These smart cards are micro processor based devices which each provide for secure metering functionality. These smart card accounting systems or smart card vault systems securely maintain various registers associated with the metering system and provide the meter accounting functionality. Additionally, the accounting systems provide for the capability of communicating register information and postage refilling and removal information to add or remove value from the various accounting registers. Each of the secure accounting systems generate the indicia and/or digital tokens needed to be imprinted on a mailpiece by the printhead 12. Additionally, the modules provide for encrypted communications into and out of the accounting system such as may be associated with the funds refilling or funds debiting function. For the particular embodiment shown, the accounting system provides for authentication of the printhead module smart card 18 and the accounting system. Whenever there is a request by a user through the keypad 62 or otherwise, to print postage, or whenever else it is desired, a mutual authentication occurs. The accounting system authenticates that it is in communication with a printhead module smart card chip 18, each authenticating the other as being authentic and valid metering systems. Thereafter encrypted communications are enabled between the active secure accounting system and the smart card chip 18 which is part of the printing system to provide security that the messages are authorized uncorrupted messages. This may be by way of a cryptographic certificate.

The metering system 2 provides added functionality and capability to the system by the employment of the two separate accounting systems 8 and 10. The internal smart card accounting system 8 is connected to the micro controller 26 via a plug connector 66. This facilitates removal of the internal smart card 8 should external inspection be required where the device is inoperative. A 3.57 megahertz crystal clock 68 is connected to the smart card 8 and to the micro controller 26. Additionally, the clock 68 is connected to the external smart card 10 via the external smart card plug connector 70. The micro controller provides a smart card sensor switch 72 detects the presence or absence of the external smart card 10. When the external smart card is detected as being present, the switch is connected to the micro controller 26 via the smart card power control circuitry 74 causing the micro controller 26 to enable the external smart card power control circuitry 74 to apply power to the external smart card and gate the crystal clock 68 to provide clock signals to the external smart card 10, both via the smart card connector 70.

It should be expressly noted that the system is configured such that it may be a system operated with both the internal accounting system 8 and an external accounting 10, with only the internal accounting system 8 and only with the external accounting system 10. Moreover the external smart card 10 is arranged so that it can be connected to other electronic metering systems and provides a portable means for a user to have postal funds available for imprinting on a mail piece or tape on other than a specific postage metering system. However, even when connected to a different electronic postage metering system the same authentication between the external smart card 10 and the print head smart card chip 18 occurs.

The system is designed with a priority arrangement. If no external secure accounting system, such as a smart card 10, is connected to the electronic postage meter system 2 the meter accounting functionality is provided by the internal secure accounting system smart card 8. This internal accounting system becomes the active accounting system for the metering system. However, if an external accounting system is connected into the system via the connector 70, the system will make the external accounting system, smart card 10, the active accounting system for the metering system 2.

Connector 70 is a flexible multi purpose connector. The connector 70 enables connections of other types of smart cards such as card 76 which contains ad slogan information (alpha numerics and/or graphic information) card 78 which contains rate table information, and smart card 80 which contains authentication code information. It should be recognized that when each of these cards 76, 78 or 80 is connected into the system via the multi-function connector 70 a self authentication process is effectuated between the smart card and the print module smart card chip 18 to ensure that valid cards and data are being employed. It may use the same encryption and/or cryptographic certificate techniques to ensure valid authentic and uncorrupted message communication. This system may be used for moving information and data into and out of the meter system 2.

The information of the type stored on cards 76, 78 and 80 are communicated from the card via the connector and the micro controller 26 to the smart card chip 18, the ASIC 20 and is stored in the flash memory 24 or the smart card chip 18 internal memory. For those embodiments which employ a ROM rather than a flash memory, the information is written into the print module smart card chip 18.

A refilling operation for the metering system 2 may be remotely implemented via the modem 28 or RS232 connector 27. A remote connection is established via the modem 28 or RS 232 connector 27 to a remote data center. This enables bi-directional communication between the data center via the modem 28 or connector 27 via the micro controller 26 to either the internal accounting system 8 and/or the external accounting system 10 and to the print module smart card chip 18. The system is configured such that if an external smart card 10 is connected to the system via connector 70, the communications will be with the external smart card and not the internal smart card chip 8. It should be expressly recognized that other protocols can be implemented by use of the keyboard to designate which of the two accounting systems should be the active system for the purpose of recharging or other meter system operation.

Whether communication is with the internal smart card chip 8 or the external smart card 10, the communications involves the remote data center interrogating the internal or external accounting system to obtain necessary information such as the status of the funding registers (ascending register and descending register) other inspection information such as evidence of tampering, meter system serial number, internal resettable timer status and resets, and other information depending upon the nature of the particular system. For recharging, the user may enter via the keyboard 62 a desired postage funding refill amount and upon suitable and successful interrogation of the active accounting system, the remote data center provides an encrypted recharging message which is communicated into the accounting system enabling refunding of the accounting system register with added additional postage value. It should be also noted that communications in this matter enables remote inspection of the metering system integrity and to upload or download other information relating to the meter system operation such as monitoring the operability and maintenance from the print module 4. Additionally, if various meter usage information is maintained in the system, this information may be uploaded to the remote data center. Moreover, the remote data center provides a vehicle for downloading additional and new encryption key or keys into the system if so configured and provides the capability for other functionality and services such as meter usage profile. Moreover, at the time of remote meter resetting, a receipt may be caused to be imprinted by the print module as a receipt for the postage accounting system funds refilling. The receipt provides tangible evidence to the user of the date, time, amount and other pertinent data of the postage accounting system refilling transaction. The receipt may include transaction number and encrypted data such as a cryptographic certificate.

In generating digital tokens or indicia, in certain instances and for certain postal authorities, the digital token is required to contain information concerning the physical location of the electronic postage of the metering system. This may be because of licensing requirements wherein a particular meter is licensed to be operated in a particular location, as for example within a particular zip code area. The metering system 2 accommodates this requirement and enables the utilization of an external smart card from originating zip locations other than that of the license location for the metering system 2. The meter location information may also be important where it is required for use when metered mail must be deposited within the zip code or originating location of the mailer.

In initialization of the meter, that is when the meter is put into service and rendered operable, the location of the metering system 2 is stored in the print module memory 24 or the internal memory of chip 12. This information may be the originating zip code for the mailer or other required location or other information. The information in the flash memory 24 or the accounting module 8 is employed in imprinting a indicia or digital token on a mail piece by print head 12. It is necessary that the digital token generated either by the external smart card 10 or the internal smart card chip 18 be such that the digital token which contains originating postal code data is accurate and consistent with the data stored in the flash memory 24 or smart card chip 18 internal memory.

At the time of initialization, the originating location data may be also stored in the internal accounting system 8. When an external accounting system or smart card 10 is connected into the system, and a request for postage is initiated, as part of the authentication process, communication is established between the external accounting system 10 and the print head smart card chip 18. At that time, a comparison is made between the originating location information stored in the flash memory 24 or smart card chip 18 internal memory and the originating location information stored in the external smart card 10. If there is a correspondence between these two location information storage, the printing of postage and generation of the digital token or indicia may proceed in the normal fashion with any other authentication and processing that may be employed. However, if the location information stored in the flash memory 24 or smart card chip 18 internal memory is inconsistent with the location information stored in the external smart card 10, the system will not operate. At this time, the location information in the external smart card is over written or alternatively may be put in a separate memory location (a travel memory location). Correspondence now exist between the location information stored in the flash memory 24 or smart card chip 18 internal memory and the location information stored in the external smart card 10. Thus, when imprinting postage and generating digital tokens an agreement exists between the data generated on the mail piece from the location information in the flash memory 24 or smart card chip 18 internal memory and from the location information stored in the external smart card 10.

If desired and as part of a routine check, the location information stored in the external smart card can be periodically checked against the location information stored in the flash memory 24 or smart card chip 18. Moreover, location information stored in both the flash memory 24 and the internal accounting system or external accounting system can be checked, if desired, whenever communications are established with the remote accounting center via the modem 28 or RS232 connector 27. Still further, should it be desired, a special purpose external smart card may be connected into the system to interrogate and verify various information stored both in the flash memory 24 and the internal smart card chip 18 or internal accounting system 8.

Figure 2:
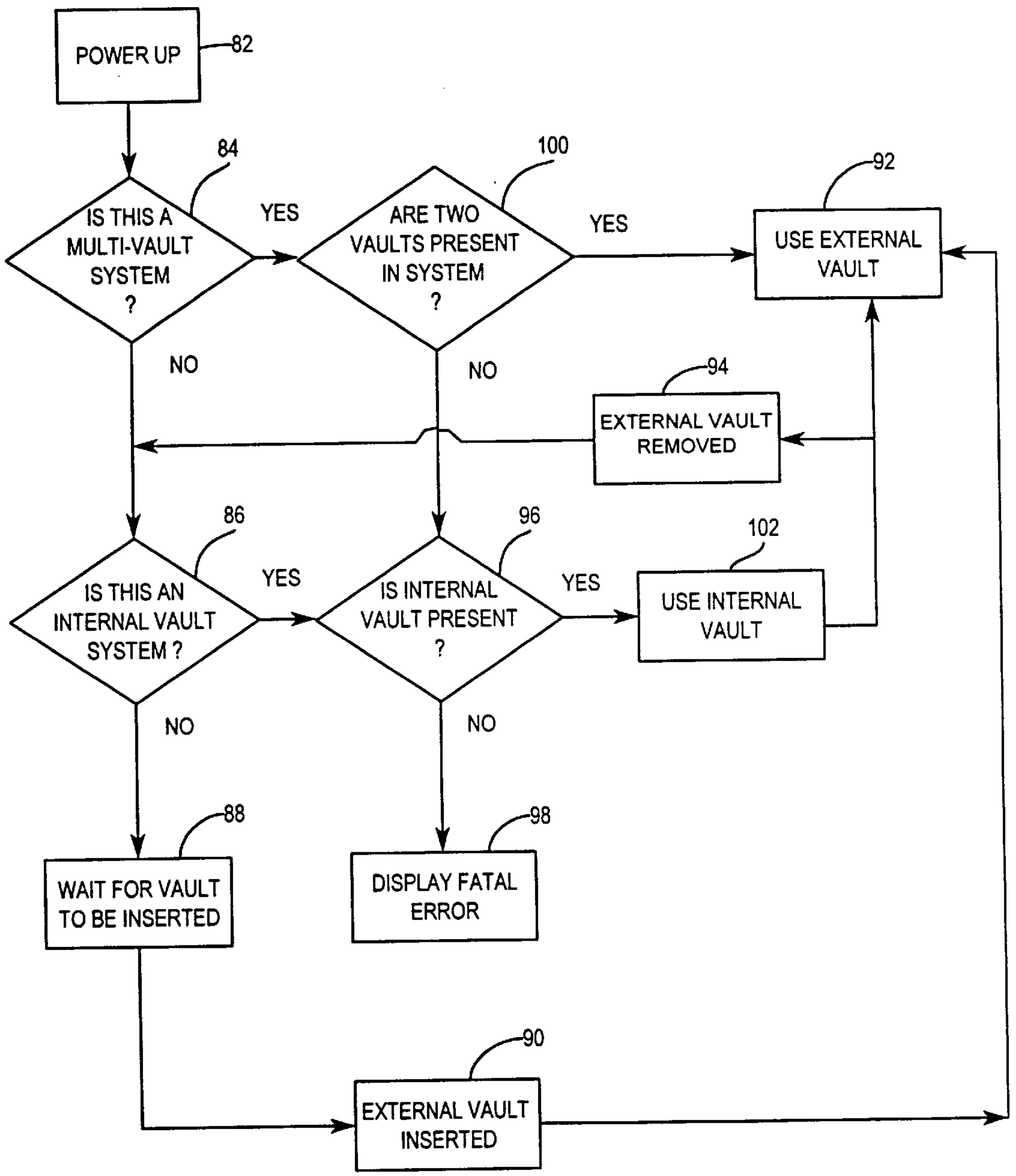
FIG. 2 is a flow chart of the metering system shown in FIG. 1 in a multi-accounting system environment.

Reference is now made to FIG. 2. At 82 the electronic postage meter system 2 is powered up. A determination is made at 84 if the system is a multi secure accounting (vault) system. That is, a determination as to whether the system includes multi accounting systems. If the system is not a multi vault accounting system, a further determination is made at 86 if the system is an internal vault system. If the system is not an internal vault system, the system must be an external vault only system. Accordingly, at 88, the system waits for a vault to be inserted.

When the external vault is inserted at 90 (or determined to be already present), the system uses the external vault for all accounting and for other secure functions at 92. Should the external vault be removed as is shown at 94, a determination is then made if an internal vault system is at 86. If no internal vault is present, no valid accounting system remains in the meter system 2 and a fatal error is displayed at 98 in the display 64. The meter system is rendered inoperable for printing postage and other operations requiring a secure accounting system.

If a determination is made that the system is a multi vault system at 84, a further determination is made at 100 if two vaults are present in the system. If two vaults are present, the system will use the external vault as shown at 92. Thus, where two vaults are present, the system always defaults to using the external vault. If a determination is made that two vaults are not present in the system at 100, the operation continues to decision box 96 as previously noted. If a determination is made that an internal vault is present at 96, the system uses the internal vault as shown at 102. This would also be the case from decision box 86 where a determination is made if the system is an internal vault system.

As can be seen from the above, when the system is powered up, the meter system 2 always defaults to operation using the external accounting system or vault. If, however, the external vault is removed at any time during operation, the system changes to utilize of the internal vault when the external vault is removed. If, on the other hand, the system has only an external accounting system or vault and the vault is not present, the system waits until an external vault is inserted into the system to commence operation. Further, if the system is an internal vault only system and a vault is not sensed as being present, the system will display a fatal error and will not operate.

Figure 3:
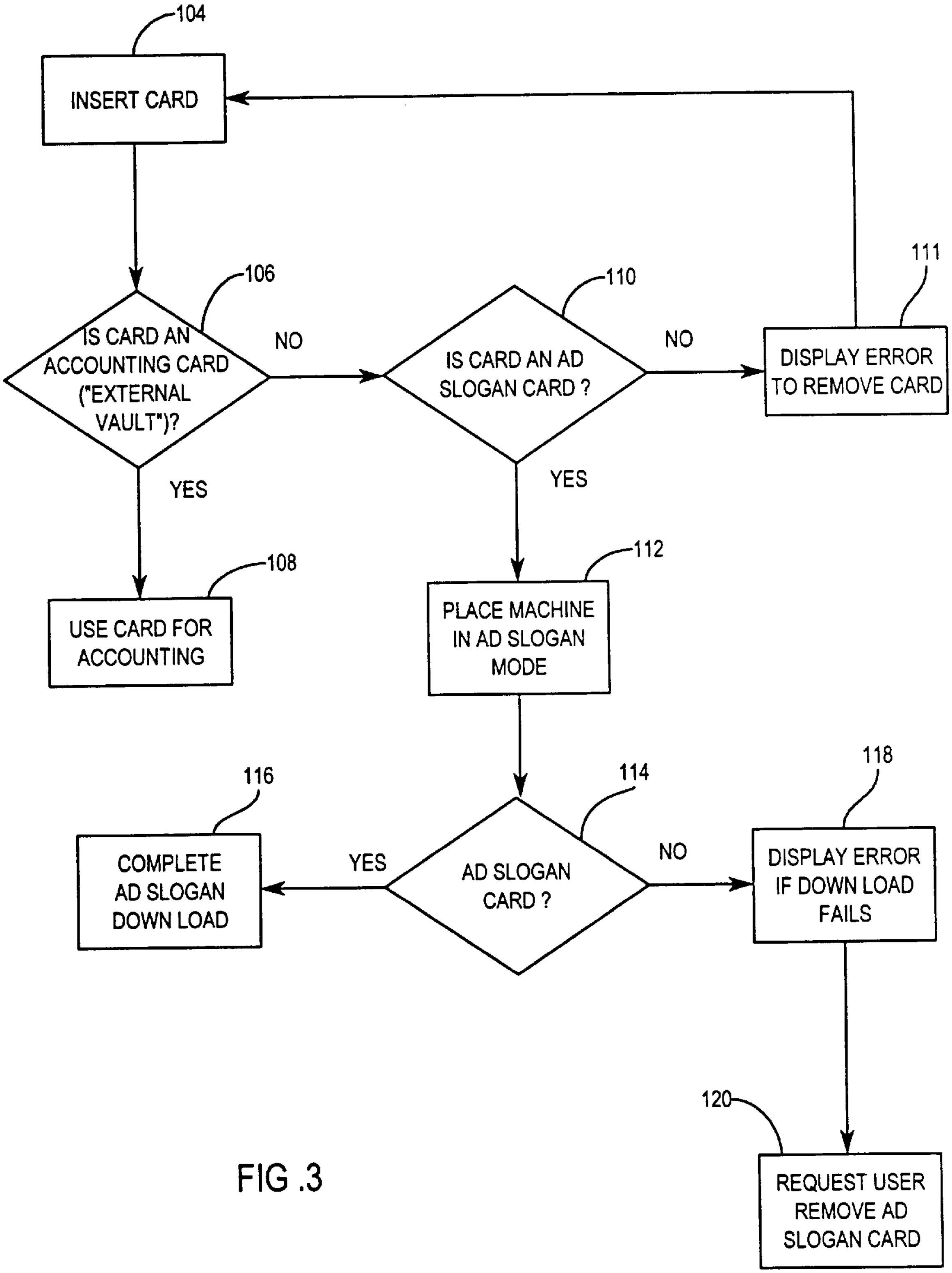
FIG. 3 is a flow chart of the operation of the postage meter system shown in FIG. 1 determining the type of an external portable means (shown as a smart card) connected to the system.

Reference is now made to FIG. 3. A card is inserted into the system at 104. A determination is made at 106 if the card is an accounting vault (external vault). If the card is determined to be an accounting vault smart card, the smart card is used for accounting as shown at 108. If the card is determined not to be an accounting card, a determination is made at 110 whether the card is an ad slogan card. An ad slogan card is a card containing inscription information, graphic information or both for imprinting by the metering system 2. If a determination is made that the system is an ad slogan card, the system is placed in the ad slogan mode at 112. A determination is then made at 114 if the ad slogan card is authentic. That is, a determination is made by means of a encrypted message such as by use of cryptographic certificate between the ad slogan card and the print module smart card chip 18 as to whether the card is valid and the ad slogan information on the card is also valid. If the card and/or data is determined to be valid, authentication is completed and the ad slogan down load is completed at 116. If the card and/or data is not authenticated, an error message is displayed in the display 64 at 118 and a request is made that the user remove the ad slogan card at 120.

It should be recognized that if other types of cards are employed, such as those shown in FIG. 1 which contain authentication code information and rate table information, etc. that the flow chart shown in FIG. 3 would have further operational steps. The additional step would determine the nature of such card and authenticate the cards and the information on such cards and proceed to download the necessary information as appropriate. This would be in a manner similar to that as is the case with the ad slogan card. Moreover, the system further enables information to be transferred from the meter to the card and written into the card for the purpose of inspection, information transmission and any other desired functionality such as transferring funds from an internal vault to an external vault for withdrawal of funds from the metering system.

Figure 4:
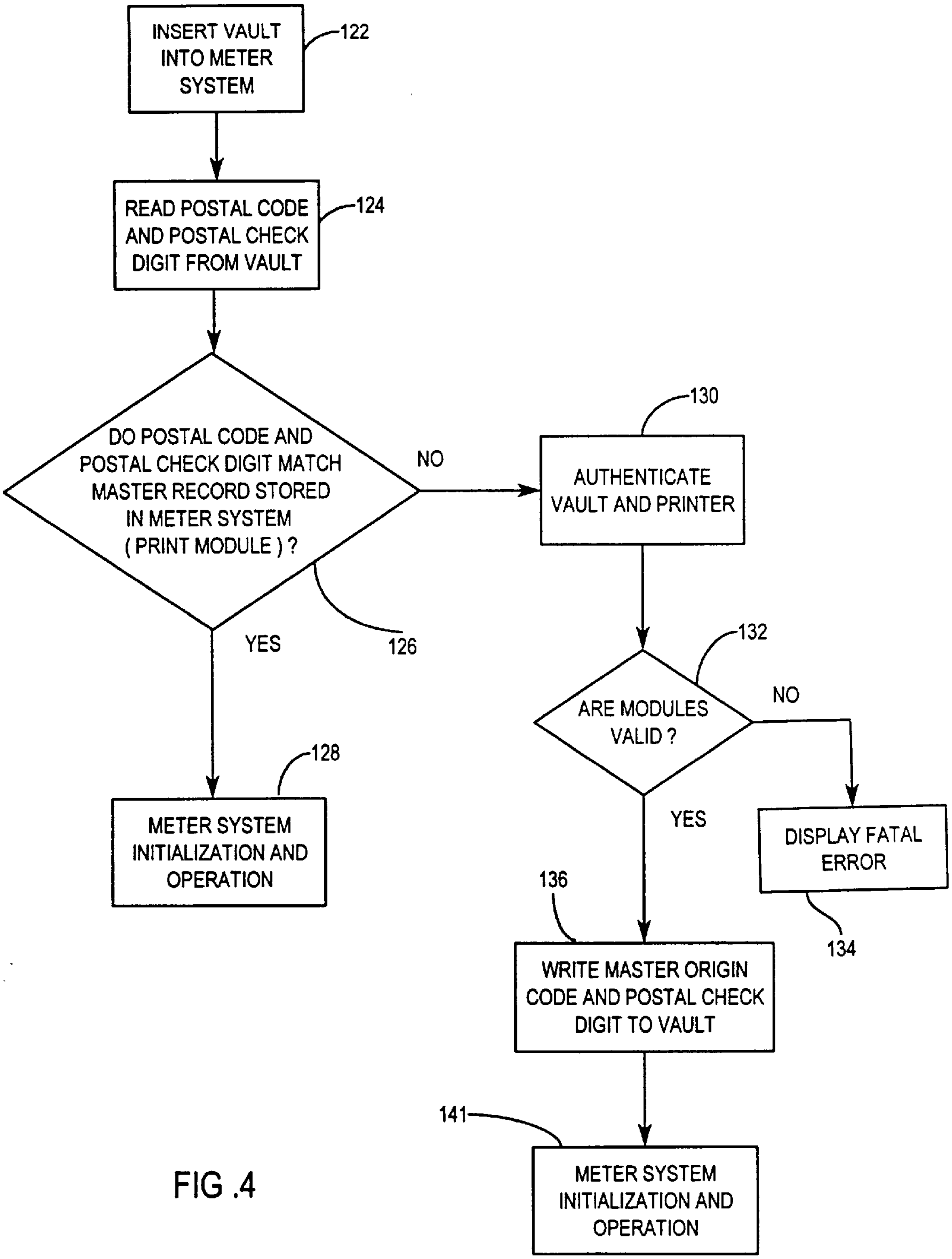
FIG. 4 is a flow chart of the operation of the meter system shown in FIG. 1 determining whether the portable means (shown as a smart card) contains the proper location data or other data employed in generating digital tokens.

Reference is now made to FIG. 4. A vault is inserted into the meter system at 122. This may be an internal accounting system inserted at the time of manufacture or an external vault inserted at any time during use. Additionally, should a different vault be inserted into the system as a substitute for the internal vault this procedure will also be followed. Additionally, the process is followed during power up of the metering system.

The postal code and postal check digit for other information is read from the vault at 124. At 126 it is determined if this postal code and postal check digit or other information matches with the postal code and postal check digit and other information stored in the meter system. Information is stored in the meter system printing module in flash memory 24 or printing module smart card chip 18 internal memory. If the information matches, the system continues initialization and operation at 128. If the information does not match, the vault (accounting system) and printer printing module attempt to authenticate each other at 130. If it is determined at 132 that the accounting system module and that the printing module are each valid and have authenticated each other, the postal code and postal check digit or other data stored in the printer module flash memory 24 or smart card chip 18 internal memory are written into the vault at 136. The meter system continues its initialization and operation at 141.

If it is determined at 132 that the accounting system and printing module are not valid, that is, they have not authenticated each other, a fatal error message is displayed in the display 64 and the system does not operate at 134.

Figure 5A:
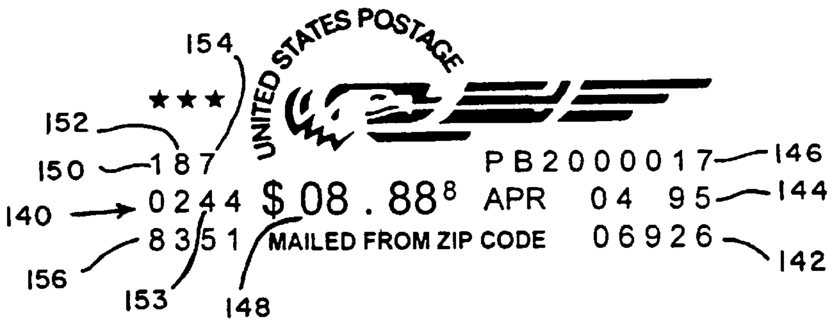
FIG. 5A ( PRIOR ART )
FIG. 5A is a depiction of a digital indicia which may be printed by the electronic metering system shown in FIG. 1.

Reference is now made to FIG. 5A. FIG. 5A shows a digital indicia suitable to be imprinted by the postage meter system shown in FIG. 1. This indicia contains alpha numeric information, which also may be printed in bar code format including PDF 417 bar code or other forms of bar code. The digital indicia includes a postal code 142 which is the licensing post office for the meter user, the date of submission of the mailpiece 144, the indicia or meter or postal security device serial number 146. This identifies the device which has printed the indicia. The postage amount imprinted on the mailpiece or tape is shown at 148. A vendor identification is imprinted at 150 as are a vendor digital token 152 and a carrier or postal service digital token 154. These digital tokens provide means for authenticating a mailpiece by information printed in the indicia to ensure that the indicia is valid and has been printed by an authorized postage metering system and has not been altered. The indicia may also include a piece count 156, which shows the number of pieces the metering system has printed; an indicia check digit 152, which is a single decimal digit, generated from variable information in the indicia, that is intended to help detect errors in these quantities and a meter check digit 140, which is a pair of decimal digits identifiers generated from decimal values identifying the meter and the meter manufacturer, that is intended to help detect errors in these quantities.

It should be noted that the information content organization and arrangement of the digital indicia are a matter of choice as is the form in which the digital indicia is imprinted. The digital indicia may be imprinted entirely in alpha numerics, entirely in any form of bar code or other coding arrangement or in a combination of alpha numerics and bar coding or other form of coding.

Figure 5B:
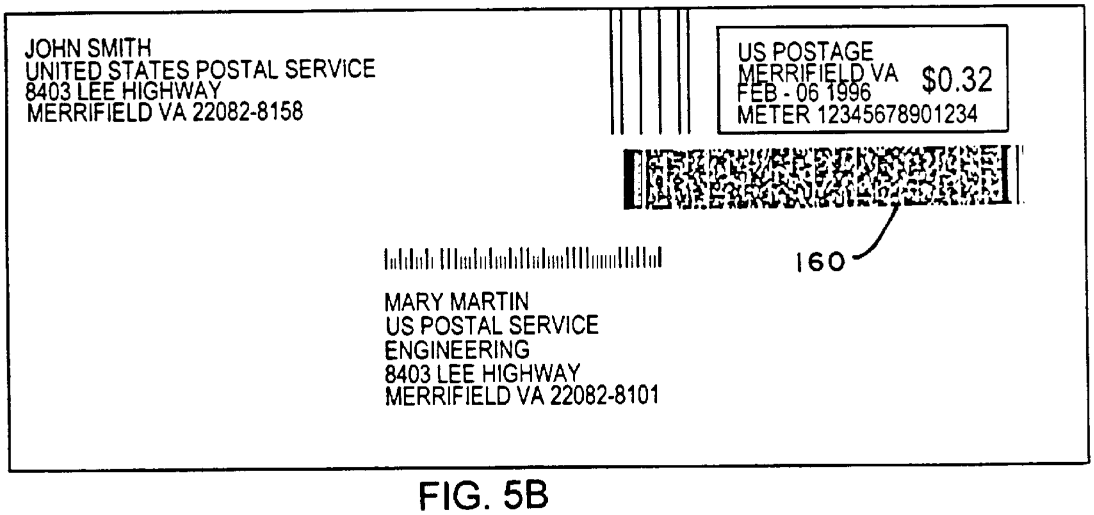
FIG. 5B ( PRIOR ART )
FIGS. 5B and 5C are digital indicias also suitable for being imprinted with metering systems of the type shown in FIG. 1 and are setforth in the Jun. 13, 1996 United States Postal Service Information Based Indicium Program (IBIP) Indicia Specification Draft in Appendix A-1.
Figure 5C:
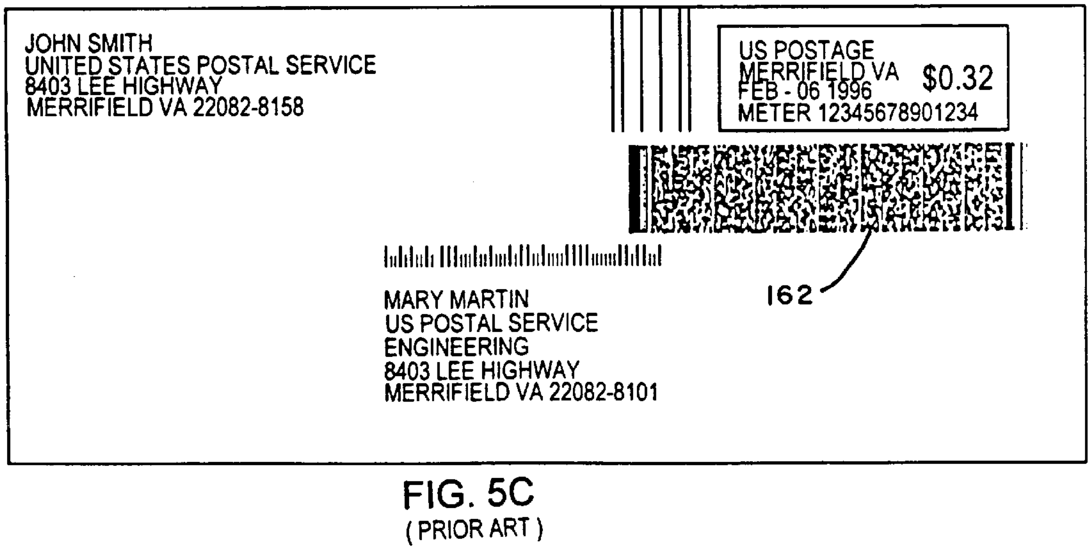
FIG. 5C ( PRIOR ART )

Reference is now made to FIGS. 5B and 5C. These FIGURES depict various forms of digital indicia imprinted entirely in bar code, PDF 417, format. FIG. 5B shows an indicium signed using DSS while FIG. 5C is an indicium signed using RSA. Both examples of such mailpiece indicium from the U.S. Postal Service Draft Information Based Indicia Program (IBIP) Indicia Specification dated Jun. 13, 1996, Appendix A-1.

Figure 6:
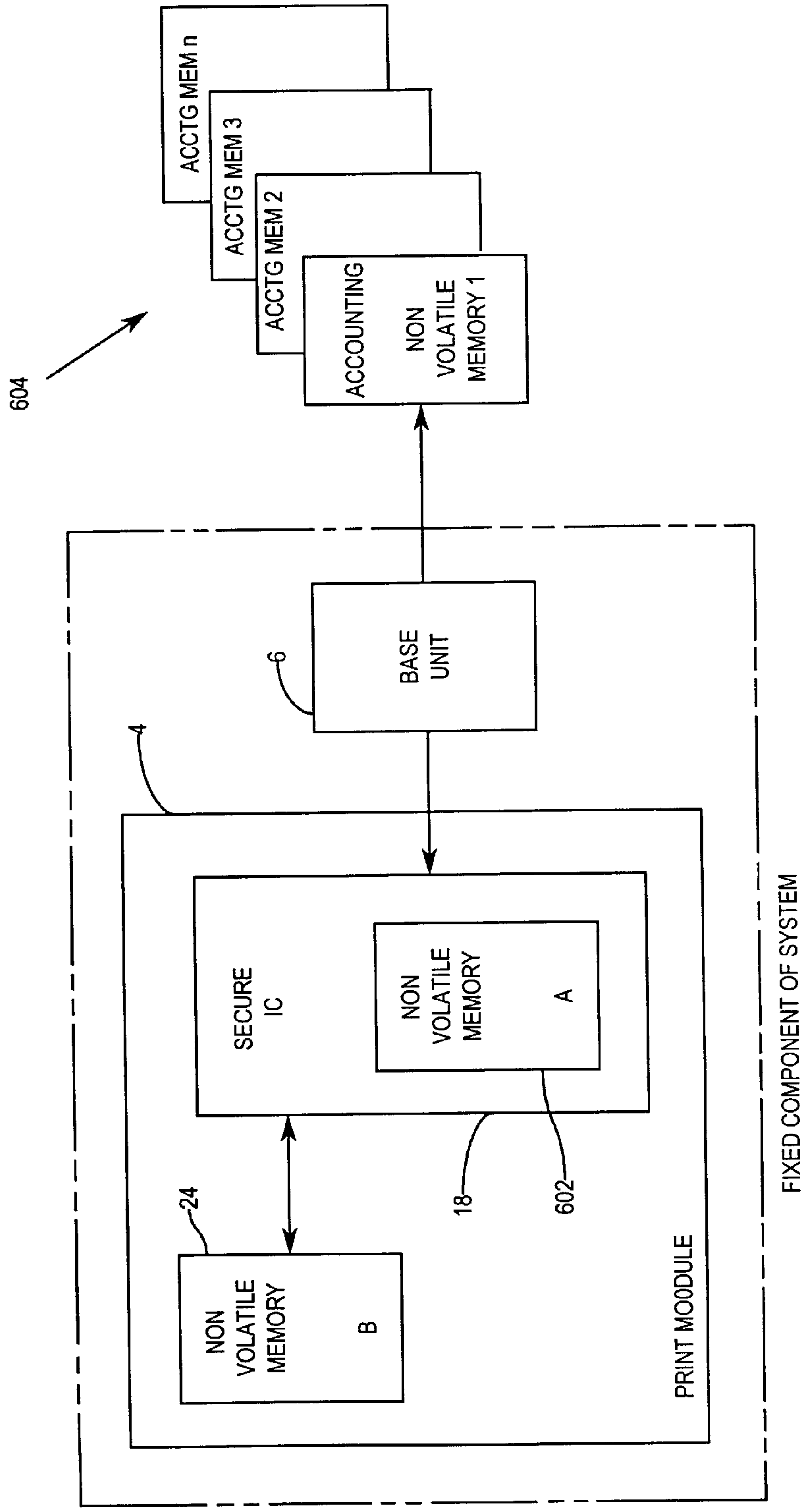
FIG. 6 is a block diagram of the postage metering system shown in FIG. 1 with further information concerning the nonvolatile memory storage and the accounting subsystem module and the printing subsystem module.

Reference is now made to FIG. 6. The printing of subsystem module smart card chip 18 includes a nonvolatile memory storage 602 which provides a secure working memory for the smart card chip 18. The memory in 602 is an electronically alterable nonvolatile memory, commonly referred to as an EEPROM. The smart card chip 18, as previously noted is connected to the ROM or nonvolatile memory 24. For the embodiment shown in FIG. 6 the configuration is a nonvolatile memory.

The print module 4 is connected via the base module 6 to the various accounting subsystems shown generally at 604. As is shown and noted above, the accounting subsystem may consist of multiple different accounting subsystems, with each accounting subsystem having its own processor with nonvolatile memory. As previously noted, these may, for example, be smart cards or other types of devices.

Figure 7:
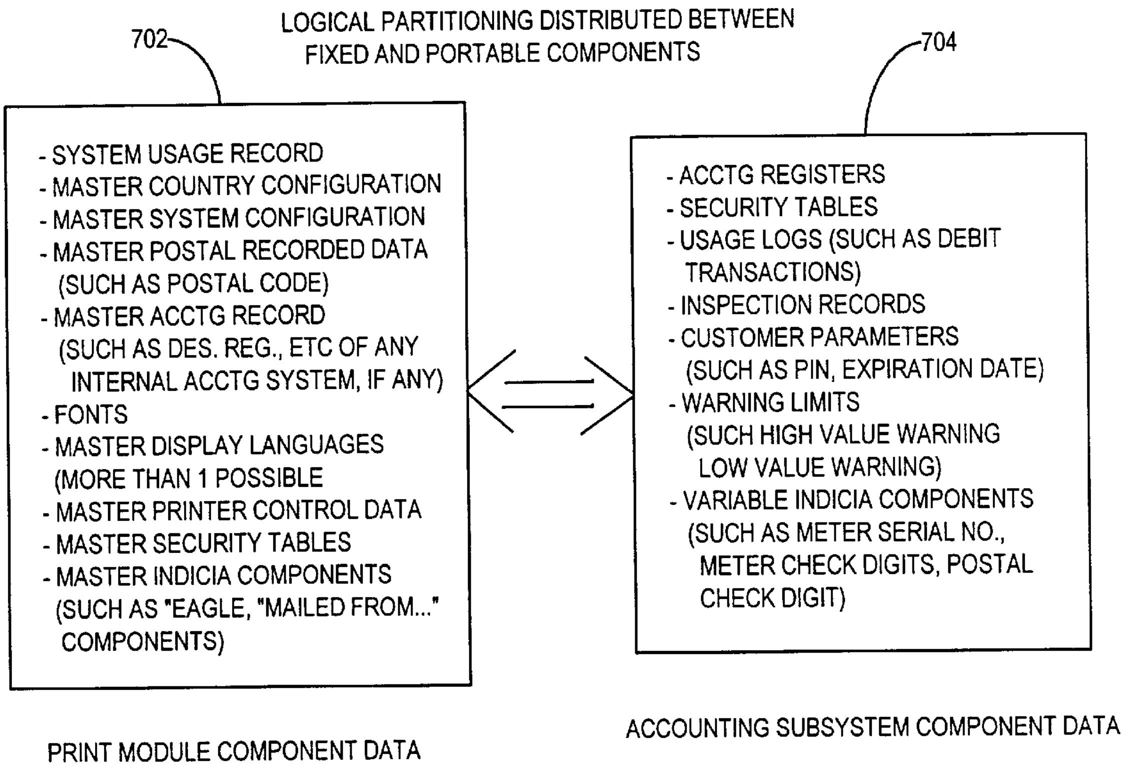
FIG. 7 is a diagrammatic representation of the logical partitioning of information distributed between the print subsystem 4 and the accounting subsystems; and, FIG. 8 is a flow chart showing the operation of the printhead subsystem memory and data of verification.

Reference is now made to FIG. 7. The information in the metering system 2 is partitioned. The information is distributed between the print module 4 and the various accounting subsystems that may be utilized with the meter system 2. The information has been partitioned in a distributed logical fashion. It is partitioned to particularly accommodate the portability of the various accounting subsystems that can be used with the metering system 2. It is also partitioned in a way to gain benefit from the recognition that the metering system 2 is less portable than the accounting subsystems. The print module component data is shown in 702 and the accounting subsystem component data is shown at 704.

The print module component data may include: systems usage record; master country configuration data; master systems configuration data; master postal recorded data (such as origin postal code); master accounting record (such as descending register, etc. any internal accounting system, if any); printing fonts; master display languages (more than one is possible); master printer control data; master security tables which contain data relating to the security aspects of the system; and master indicia components (such as eagle wings, other graphics, standard phrases such as mailed from, and other fixed components of the indicia).

The accounting subsystem component data may include the following types of data: accounting registers; security tables; usage logs (such debit transactions or refill transactions); inspection records; customer parameter (such as authorization codes; pin numbers; expiration dates); warning limits (such as high value warning, low value warning); and variable indicia data components (such as meter serial number; check digits, and postal check digits).

It should be recognized that this data configuration can be modified to meet the requirements of different national postal systems where different information is required to be stored by the metering system and where different information may be required to be printed as part of the indicia. Moreover, the nature and organization of the information may also change for different types of indicias, encrypted indicias and digital tokens.

Figure 8:
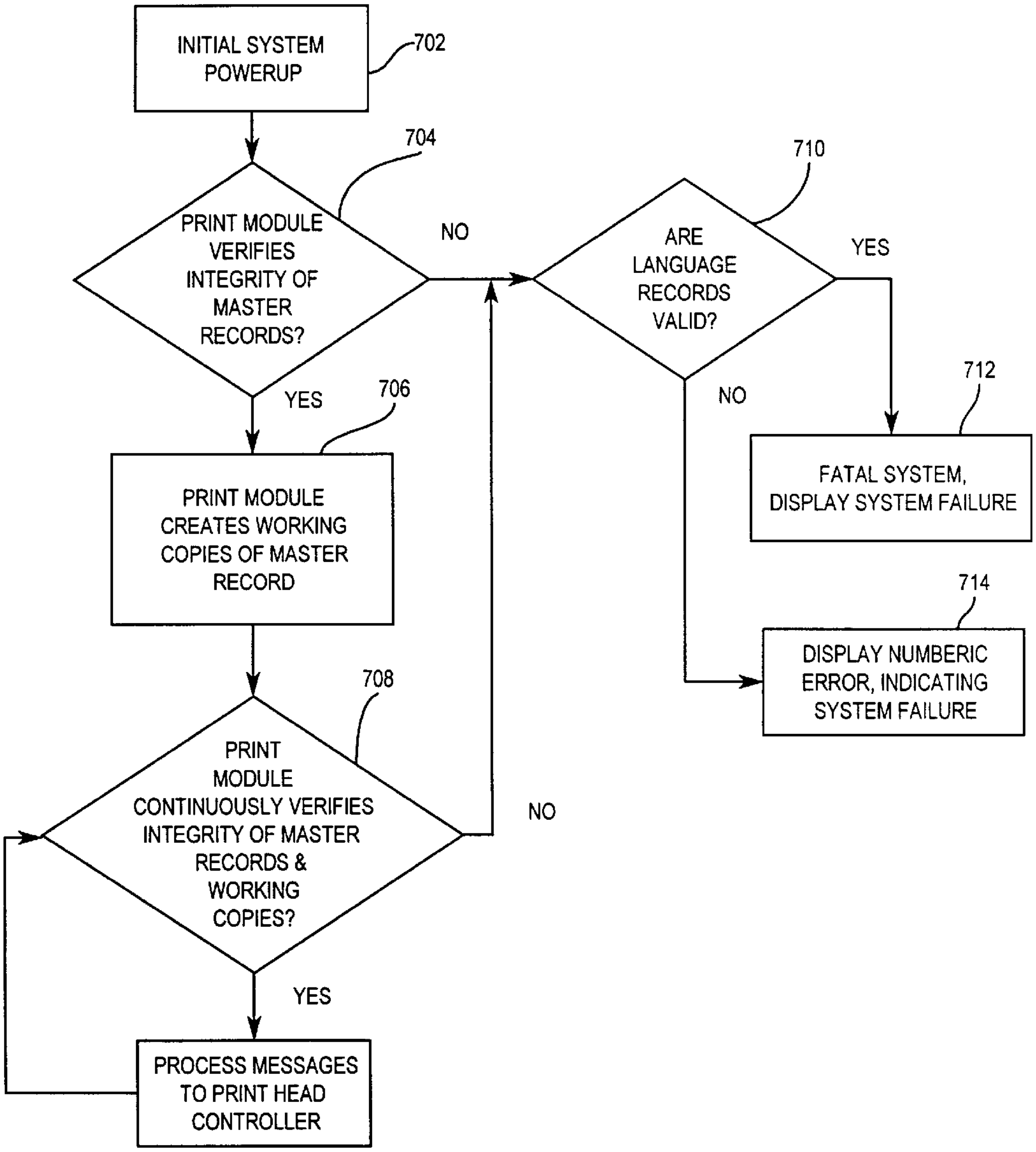

Reference is now made to FIG. 8. The data in the printhead subsystem is maintained as a working copy in the smart card chip 18 internal memory and as a master copy in the nonvolatile memory 24. The system is initially powered up at 702. At 704, the print module verifies the integrity of the master data records in the memory 24. If the data is verified, the print module creates a working copy of the master record in the smart card chip memory 18 at 706. The print module continuously verifies the integrity of the master records and working copies at 708 during the operation of the metering system. This is a continuous process that continues as long as the power is applied to the system. Assuming the data is verified, the printhead controller (which is the smart card chip 18) processes messages to the printhead controller as required and then returns operation of the system to the verification of the integrity of the master record and working copies at 708.

If the integrity is not verified at 708, a determination is made at 710 if the language records are affected by the non-verification. If they are not affected by the problem, an error message is displayed in the display 64 (FIG. 1) at 712. If the language records are not valid, the display 64 merely displays a numeric indicator that there is a system failure and the metering system is rendered inoperable.

It should be noted that in the beginning of the process, should the print module fail to verify the integrity of the master records, the program branches to decision block 710.

While the present invention has been disclosed and described with reference to the specific embodiments described herein, it will be apparent, as noted above and from the above itself, that variations and modifications may be made therein. It is, thus, intended in the following claims to cover each variation and modification that falls within the true spirit and scope of the present invention.

What is claimed:

1. A method of printing a postage indicium comprising:

providing a postage metering system comprising a vault and a printing module;

confirming that information from the vault does not match information from the printing module;

writing an origin postal code to the vault, in the event that the information from the vault does not match information from the printing module; and printing the postage indicium with the postage metering system.

2. The method as claimed in claim 1 wherein the vault is a smart card configured for compatibility with the postage metering system.

3. The method claimed in claim 1 wherein two or more smart cards are configured for compatibility with the postage metering system.

4. The method as claimed in claim 1 wherein the information from the vault and the information from the printing module are related to an origin postal code.

5. The method as claimed in claim 1 wherein the information from the printing module is an origin postal code, a packed postal code and a postal check digit.

6. The method as claimed in claim 1 wherein the information from the printing module is stored in a print head.

* * * * *